United States Patent Office 3,646,052
Patented Feb. 29, 1972

3,646,052
7-v-TRIAZOLYL-(2)-COUMARIN COMPOUNDS
Otto Neuner and Alfons Dorlars, Leverkusen, Carl-Wolfgang Schellhammer, Opladen, and Otto Berendes, Cologne-Stammheim, Germany, assignors to Farbenfabriken Bayer Aktiengesellschaft, Leverkusen, Germany
No Drawing. Continuation of application Ser. No. 662,065, Mar. 10, 1967. This application Mar. 11, 1970, Ser. No. 18,003
Claims priority, application Germany, Mar. 19, 1966, F 48,712
Int. Cl. C07d 99/04; C09k 1/02
U.S. Cl. 260—308 A          9 Claims

ABSTRACT OF THE DISCLOSURE 7-v-triazolyl - (2) - coumarin compounds as brightening agents for polyester and polyvinyl chloride materials.

---

This is a continuation of Ser. No. 622,065, filed Mar. 10, 1967, and now abandoned.

The present invention relates to 7-v-triazolyl - (2)-coumarin compounds; more particularly it concerns blue-fluorescent 7-v-triazolyl - (2) - coumarin compounds of the formula

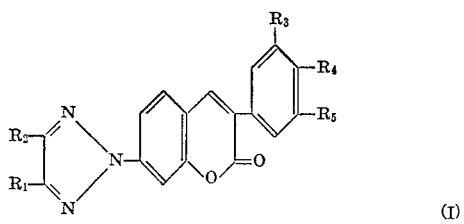

(I)

wherein $R_1$ is hydrogen or an optionally substituted alkyl or aryl radical, $R_2$ is an optionally substituted alkyl or aryl radical, cyano, a carboxylic acid group, a carboxylic acid ester group, an optionally substituted carboxylic acid amide group or an acylated amino group, and $R_3$, $R_4$ and $R_5$, independently of one another, stand for hydrogen, halogen, alkyl radicals or alkoxy groups.

The 7-v-triazolyl - (2) - coumarin compounds of the Formula I are valuable brightening agents. They are suitable for brightening a great variety of materials, especially for brightening fibres, filaments, fabrics, knitted fabrics and foils of synthetic origin and chiefly for brightening materials made of polyesters or polyvinyl chloride and for brightening lacquers and varnishes of cellulose esters or nitrocellulose. The compounds can be applied as brightening agents in the usual manner, for example, in the form of aqueous dispersions or in the form of solutions in inert solvents; if desired, they can also be applied in combination with detergents or they can be added to casting masses serving for the production of foils or filaments. The amounts of the 7-v-triazolyl - (2) - coumarin compounds of the Formula I required for brightening purposes can easily be established by preliminary experiments; in general, amounts of 0.1 to 1% of the compounds referred to the weight of the material to be treated will be sufficient. The brightening effects obtained by means of the 7-v-triazolyl - (2) - coumarin compounds of the Formula I are very fast to light and have an excellent fastness to washing. The coumarin compounds hitherto proposed as brightening agents do not have these valuable properties to the same extent.

The 7-v-triazolyl - (2) - coumarin compounds of the present invention can be prepared by various methods. Those compounds which correspond to the Formula I wherein $R_2$ stands for an optionally substituted alkyl or aryl radical, while the symbols $R_1$, $R_3$, $R_4$ and $R_5$ have the same meaning as above, can be obtained, for example, by condensing 7-hydrazino-coumarin derivatives of the formula

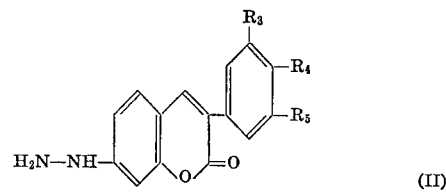

(II)

with α-oximino-ketones of the formulae

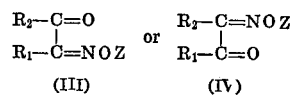

(III)        (IV)

wherein Z stands for hydrogen or an acyl radical, for example, an acetyl radical, and converting the resultant α - oximino - hydrazones into the 7 - v - triazolyl - (2)-coumarin compounds with the elimination of HOZ.

7-v-triazolyl - (2) - coumarin compounds of the Formula I wherein $R_2$ stands for cyano, a carboxyl group, a carboxylic acid ester group or an optionally substituted carboxylic acid amide group, while the symbols $R_1$, $R_3$, $R_4$ and $R_5$ have the same meaning as above, can be obtained, for example, by coupling diazo compounds of 7-amino-coumarin derivatives of the formula

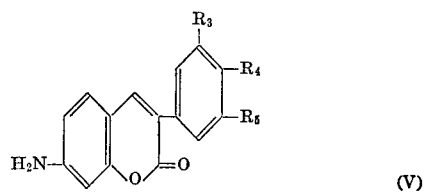

(V)

with enamines of the formula

(VI)

for example, with β - amino - crotonic acid nitrile, β-amino-crotonic acid esters or amides or with β-amino-cinnamic acid nitrile, β-amino-cinnamic acid esters or amides, converting the resultant azo compounds with an ammoniacal solution of a copper (II) salt into the copper complexes, transforming the latter into the 7-v-triazolyl-(2)-coumarin compounds by heating and, if desired, hydrolysing the carboxylic acid nitrile, ester or amide group to form the carboxyl group.

7-v-triazolyl - (2) - coumarin compounds of the Formula I wherein $R_2$ stands for an acylated amino group, while $R_1$, $R_3$, $R_4$, and $R_5$ have the same meaning as above, can be obtained, for example, by coupling diazo compounds of 7-amino-coumarin derivatives of the Formula V with α-nitro-oximes of the formula

for example, with nitro-acetaldoxime or with ω-nitro-acetophenone-oxime, cyclising the resultant azo compounds to form the corresponding 7-[4-nitro-triazolyl-(2)]-coumarin compounds, reducing the nitro group to the amino group and converting the latter into the acyl-amino group $R_2$. 7-v-triazolyl-(2)-coumarin compounds of the Formula I wherein $R_2$ stands for an acylated amino group and $R_1$ stands for an optionally substituted aryl radical, while $R_3$, $R_4$ and $R_5$ have the same meaning as above, can also be obtained by condensing 7-hydrazino-coumarin compounds of the Formula II with 1,2,4-oxa-diazoles of the formula

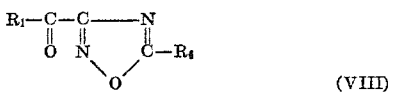

wherein $R_6$ stands for an alkyl or aryl radical, rearranging the resultant hydrazones to form 7-v-triazolyl-(2)-coumarin compounds of the formula

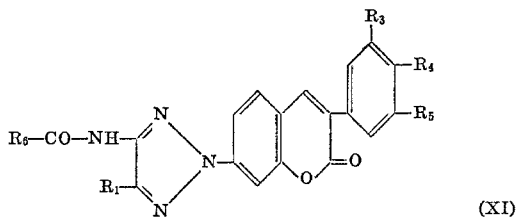

and, if necessary, replacing the acylamino group $R_6$—CO—NH with the acylamino group $R_2$.

The following examples serve to illustrate the invention without, however, limiting its scope.

EXAMPLE 1

A fabric of polyester fibres is padded with an aqueous liquor containing, per litre, 1 g. of one of the 7-v-triazolyl-(2)-coumarin compounds of Formula I listed in the table below under (a)–(q) as brightening agent and 3 g. of a commercial dispersing agent based on fatty alcohol polyglycol ethers. The fabric is squeezed to a weight increase of 100%, then dried and heated at 120° C. for 30 minutes. Compared with untreated material, the fabric thus treated exhibits a strong neutral brightening effect of good fastness to light.

The compound listed in the table under (a) was prepared in the following manner:

25.2 grams (0.1 mole) 3-phenyl-7-hydrazino-coumarin were heated with 12.0 g. (0.12 mole) diacetyl monoxime and 10 ml. of a 50% acetic acid in 400 ml. ethanol while stirring and cooling under reflux. When free hydrazine was no longer indicated in a spot test with o-naphthoquinone-sulphonic acid, as was the case after about one hour, the mixture was cooled and the precipitated yellow condensation product filtered off with suction. 30 grams of the α-oximino-hydrazone so obtained were then heated under reflux with 400 ml. acetic anhydride, 20 g. of anhydrous sodium acetate and 20 ml. acetic acid for 8 hours. The acetic acid and part of the excess acetic anhydride were subsequently distilled off under reduced pressure. The precipitated pale yellow brightening agent was filtered off with suction, washed with cold methanol and dried.

The 7-v-triazolyl-(2)-coumarin compounds listed under (b) to (m) were prepared in an analogous manner. For the preparation of the compounds listed under (b), (c), (d) and (e) as well as under (g) to (m) the diacetyl monoxime used for the preparation of the compounds listed under (a) and (f) was replaced with oximino-acetophenone (b;g), oximino-propiophenone or 1-oximino - 1 - phenylacetone (c;h), 1-oximino-1-p-chlorophenylacetone (d;k), 1-oximino-1-o-tolyl-acetone (e), 1-oximino-1-p-tolyl-acetone (i), 1-oximino - 1 - o - chlorophenyl-acetone (l) or benzil-monoxime (m); for the preparation of the compounds listed under (f) to (m), moreover, the 3-phenyl-7-hydrazino-coumarin was replaced with 3-p-tolyl-7-hydrazino-coumarin.

The compound listed under (n) was prepared in the following manner: 18 g. (0.11 mole) β-aminocinnamic acid amide were dissolved in alcohol while heating and, after cooling, coupled in known manner at pH 5 and 5 to 10° C. with the diazo compound of 23.7 g. (0.1 mole) 3-phenyl-7-amino-coumarin. The precipitated azo compound was filtered off with suction and stirred into 600 ml. glycol monomethyl ether. After the addition of a solution of 40 g. of crystalline copper (II) chloride in 200 ml. of aqueous ammonia, the mixture was heated on a water bath while stirring and stirring on the water bath was continued for 4 hours to convert the copper complex formed. When no more complex copper compound could be detected, the mixture was poured into 2.5 litres of water, the resultant precipitate was filtered off with suction and recrystallised from dimethyl formamide, whereby the 3 - phenyl-7-[4-phenyl-5-carbonamido-v-triazolyl-(2)]-coumarin was obtained in the form of slightly yellow crystals. The compound listed under (o) was prepared in an analogous manner by replacing the β-amino-cinnamic acid amide with β-amino-crotonic acid ethyl ester, and the compounds listed under (p) and (q) were prepared by also replacing the 3-phenyl-7-amino-coumarin with 3-p-tolyl-7-amino-coumarin.

EXAMPLE 2

A fabric of polyester fibres is introduced in a liquor ratio of 1:40 into a bath containing, per litre, 1.5 g. sodium oleyl-sulphate, 0.75 g. formic acid and 0.1 g. of one of the 7-v-triazolyl-(2)-coumarin compounds of Formula I listed in the Table below under (a) to (p) as brightening agent. The bath is heated to boiling temperature within 30 minutes and kept at boiling temperature for about 45 minutes, while the fabric is moderately moved about. The fabric is subsequently rinsed and dried. It exhibits an excellent neutral brightening effect.

| 7-v-triazolyl-(2)-coumarin compound | $R_1$ | $R_2$ | $R_3$ | $R_4$ | $R_5$ | Melting point, ° C. |
|---|---|---|---|---|---|---|
| (a) | $CH_3$ | $CH_3$ | H | H | H | 232–234 |
| (b) | H | $C_6H_5$ | H | H | H | 246 |
| (c) | $CH_3$ | $C_6H_5$ | H | H | H | 161–162 |
| (d) | $CH_3$ | p-Cl—$C_6H_4$ | H | H | H | 189–192 |
| (e) | $CH_3$ | o-$CH_3$—$C_6H_4$ | H | H | H | 180 |
| (f) | $CH_3$ | $CH_3$ | H | $CH_3$ | H | 232 |
| (g) | H | $C_6H_5$ | H | $CH_3$ | H | 247 |
| (h) | $CH_3$ | $C_6H_5$ | H | $CH_3$ | H | 192–193 |
| (i) | $CH_3$ | p-$CH_3$—$C_6H_4$ | H | $CH_3$ | H | 232–234 |
| (k) | $CH_3$ | p-Cl—$C_6H_4$ | H | $CH_3$ | H | 245–246 |
| (l) | $CH_3$ | o-Cl—$C_6H_4$ | H | $CH_3$ | H | 210–210 |
| (m) | $C_6H_5$ | $C_6H_5$ | H | $CH_3$ | H | 228–229 |
| (n) | $C_6H_5$ | $CONH_2$ | H | H | H | 264–265 |
| (o) | $CH_3$ | $COOC_2H_5$ | H | H | H | 202–203 |
| (p) | $C_6H_5$ | $CONH_2$ | H | $CH_3$ | H | 286–287 |
| (q) | $CH_3$ | $COOC_2H_5$ | H | $CH_3$ | H | 204–206 |

| 7-v-triazolyl-(2)-coumarin compound | R₁ | R₂ | R₃ | R₄ | R₅ | Melting point, °C |
|---|---|---|---|---|---|---|
| (a) | H | CH₃CO—NH | H | H | H | 268–270 |
| (b) | H | C₂H₅CO—NH | H | H | H | 228–230 |
| (c) | H | CH₃—(CH₂)₂—CO—NH | H | H | H | 216–218 |
| (d) | H | (CH₃)₂CH—CH₂—CO—NH | H | H | H | 220–221 |
| (e) | H | C₂H₅O—CH₂—CO—NH | H | H | H | 162–163 |
| (f) | H |  CH₃O—⟨ ⟩—CO—NH | H | H | H | 255.5–256.5 |
| (g) | H | 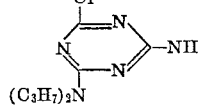 | H | H | H | 233–234 |
| (h) | H | 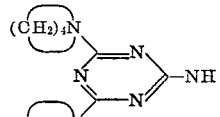 | H | H | H | 231–233 |
| (i) | H | 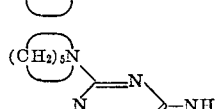 | H | H | H | 253–254 |
| (k) | H | 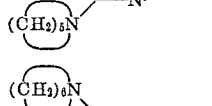 | H | H | H | 205–206 |
| (l) | H | CH₃CO—NH | H | CH₃ | H | 257–258 |
| (m) | H | (CH₃)₃C—CO—NH | H | CH₃ | H | 243–244 |
| (n) | H | C₂H₅O—CH₂—CO—NH | H | CH₃ | H | 185–186.5 |
| (o) | H |  CH₃O—⟨ ⟩—CO—NH | H | CH₃ | H | 252 |
| (p) | H | 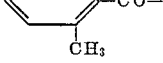 ⟨ ⟩—CO—NH, CH₃ | H | CH₃ | H | 256–257 |

The 7-v-triazolyl-(2)-coumarin compounds listed in the table under (a) to (k) were prepared as follows:

The diazo compound of 23.7 g. (0.1 mole) 3-phenyl-7-amino-coumarin was coupled in known manner at 5 to 10° C. and pH 5 with 11.5 g. (0.11 mole) nitroacetaldoxime. The precipitated azo compound was filtered off with suction and, after drying, introduced into 350 ml. acetic anhydride. The mixture was subsequently heated under reflux with stirring for 4 hours and then cooled. The precipitated nitro-triazole compound was filtered off with suction, washed with glacial acetic acid and recrystallised from dimethyl formamide. The 3-phenyl-7-[4-nitro-v-triazolyl-(2)]-coumarin of melting point 274° C. so obtained was suspended at 50° C. in dimethyl formamide and, after the addition of 10 g. Raney nickel, hydrogenated at 50° C. and under a hydrogen pressure of 50 at. When the absorption of hydrogen was completed, the solution was filtered off from the catalyst and the solvent distilled off. The resultant 3-phenyl-7-[4-amino-v-triazolyl-(2)]-coumarin had a melting point of 231 to 232° C. after recrystallisation from methyl glycol. The 3-phenyl-7-[4-amino-v-triazolyl-(2)]-coumarin was subsequently reacted with acetyl chloride (a), propionyl chloride (b), n-butyryl chloride (c), isovaleryl chloride (d), ethoxy-acetyl chloride (e), p-anisoyl chloride (f) or 2-dipropylamide-4,6-dichloro-1,2,3,5-triazine (g) or condensed first with cyanuric chloride and then with pyrrolidine (h), piperidine (i) or hexamethylene-imine (k).

The 7-v-triazolyl-(2)-coumarin compounds listed under (l) to (p) were prepared in an analogous manner. The diazo compound of 3-p-tolyl-7-amino-coumarin was coupled with nitroacetal-doxime, the resultant azo compound was converted with acetic anhydride into 3-p-tolyl-7-[4-nitro-v-triazolyl-(2)-coumarin of melting point 261° C. and this nitro compound was then hydrogenated, after the addition of Raney nickel, in the manner described above to form 3-p-tolyl-7-[4-amino-v-triazolyl-(2)-]coumarin of melting point 236° C. The 3 - p-tolyl-7-[4-amino-v-triazolyl-(2)]-coumarin so obtained was subsequently reacted with acetyl chloride (l), pivaloyl chloride (m), ethoxyacetyl chloride (n), p-anisoyl chloride (o) or o-toluyl chloride (p).

EXAMPLE 3

A fabric of cellulose acetate fibres is moved about in a liquor ratio of 1:40 and at 60° C. for 45 minutes in an aqueous bath containing, per litre, 1 g. sodium oleyl-sulphate, 0.75 g. formic acid and 0.1 g. of one of the 7-triazolyl-(2)-coumarin compounds of Formula I listed in the Table below as brightening agent. The fabric is subsequently rinsed and dried. After this treatment, the material is excellently brightened.

| 7-v-triazolyl-(2)-coumarin compound | R₁ | R₂ | R₃ | R₄ | R₅ | Melting point, °C. |
|---|---|---|---|---|---|---|
| (a) | H | C₂H₅O—CO—NH | H | CH₃ | H | ¹250 |
| (b) | H | 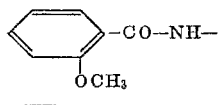 -CO-NH- with OCH₃ | H | H | H | 248-250 |
| (c) | H |  pyrrolidinone N— | H | CH₃ | H | 267-268 |
| (d) | H | 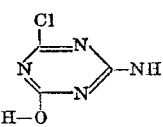 Cl, (CH₃)₂CH—O triazine -NH | H | CH₃ | H | ¹265 |

¹ (Decomp.)

These 7-v-triazolyl-(2)-coumarin compounds were obtained by reacting the 3-phenyl- or 3-p-tolyl-7-[4-amino-v-triazolyl-(2)]-coumarin described in Example 2 with chloroformic acid ethyl ester (a), 2-methoxy-benzoyl chloride (b), γ-butylrolactone (c) or 2-isopropovy-4,6-dichloro-1,3,5-triazine (d).

Good results are also obtained, when the 7-v-triazolyl-(2)-coumarin compounds listed in the present Example under (a) to (d) are replaced with the compounds listed in Example 1 under (a), (c) and (f) and in Example 2 under (a), (e), (l) and (n).

EXAMPLE 4

A fabric of polyester fibres is padded with an aqueous liquor containing, per litre, 1 g. of a commercial dispersing agent based on fatty alcohol polyglycols ethers, 1 g. of a commercial wetting agent based on alkylnaphthalene sulphonic acids, 4 g. of a commercial thickening agent based on sodium alginate and a solution of 1 g. of one of the 7-v-triazolyl-(2)-coumarin compounds of Formula I in 20 g. triethanol amine which are listed in the table of Example 1 under (a) to (q) or in the table below under (a) to (o) as brightening agents. The fabric is squeezed to a weight increase of 100%, then dried, heated to 190° C. for 1 minute and washed with hot water. Compared with the untreated material, the fabric thus treated exhibits a strong clear brightening effect of good fastness to light.

| 7-v-triazolyl-(2)-coumarin compound | R₁ | R₂ | R₃ | R₄ | R₅ | Melting point °C. |
|---|---|---|---|---|---|---|
| (a) | CH₃ | CH(CH₃)₂ | H | H | H | 116-118 |
| (b) | H | p-CH₃—C₆H₄ | H | H | H | 291.5-293 |
| (c) | H | 2,4—(CH₃)₂C₆H₃ | H | H | H | 245-247 |
| (d) | H | p-CH₃O—C₆H₄ | H | H | H | 241-242 |
| (e) | CH₃ | o-CH₃O—C₆H₄ | H | H | H | 176.5-177 |
| (f) | C₂H₅ | C₆H₅ | H | H | H | 176-177.5 |
| (g) | CH₃ | CH(CH₃)₂ | H | CH₃ | H | 163-164 |
| (h) | H | p-CH₃—C₆H₄ | H | CH₃ | H | 271-271.5 |
| (i) | H | 2,4—(CH₃)₂C₆H₃ | H | CH₃ | H | 212.5-213 |
| (k) | CH₃ | o-CH₃O—C₆H₄ | H | CH₃ | H | 174-175 |
| (l) | CH₃ | CH(CH₃)₂ | H | Cl | H | 201-202 |
| (m) | CH₃ | C₆H₅ | H | OC₄H₉ | H | 153.5-154.5 |
| (n) | C₆H₅ | COOC₂H₅ | H | H | H | 193-193.5 |
| (o) | C₆H₅ | COOC₂H₅ | H | CH₃ | H | 198-199 |

The 7-v-triazolyl-(2)-coumarin compounds listed in the above table under (a) to (m) were prepared in a manner analogous to the preparation of the 7-v-triazolyl-(2)-coumarin compound in the table of Example 1 under (a). For this purpose instead of diacetyl monoxime 4-methyl-3-oximino-pentanone-2 (a;g;1), p-methyl-oximino-acetophenone (b;h), 2,4-dimethyl-oximino-acetophenone (c;i), p-methoxy-oximino-acetophenone (d), 1-oximino-1-o-methoxyphenylacetone (e;k), oximino-valerophenone (f) or oximino-propiophenone (m) were used; furthermore for the preparation of the compounds listed under (g) to (k) 3-p-tolyl-7-hydrazino-coumarin and for the preparation of the compounds listed under (l) and (m) 3-p-chlorophenyl-7-hydrazino-coumarin and 3-p-n-butoxyphenyl-7-hydrazino-coumarin respectively were used instead of 3-phenyl-7-hydrazino-coumarin.

The 7-v-triazolyl-(2)-coumarin compounds listed in the above table under (n) and (o) were prepared in a manner analogous to the preparation of the 7-v-triazolyl-(2)-coumarin compound listed in the table of Example 1 under (n). For this purpose β-aminocinnamic acid ethyl ester was used instead of β-aminocinnamic acid amide and furthermore for the preparation of the 7-v-triazolyl-(2)-coumarin compound listed under (o) 3-p-tolyl-7-aminocoumarin was used instead of 3-phenyl-7-aminocoumarin.

EXAMPLE 5

1 gram of one of the 7-v-triazolyl-(2)-coumarin compounds of Formula I listed in the following table is incorporated as brightening agent into 1000 g. of an opaque soft polyvinyl chloride. The material is then excellently brightened and exhibits a neutral white shade.

| 7-v-triazolyl-(2)-coumarin compound | $R_1$ | $R_2$ | $R_3$ | $R_4$ | $R_5$ | Melting point. °C. |
|---|---|---|---|---|---|---|
| (a) | H | ⌬-CO-NH (OCH₃) | H | H | H | 248-250 |
| (b) | H | ⌬-CO-NH (OCH₃) | H | CH₃ | H | 247-248.5 |
| (c) | H | (C₂H₅)₂N-triazine-NH, (C₂H₅)₂N | H | CH₃ | H | 218-220 |
| (d) | H | (i-C₄H₉)₂N-triazine-NH, (i-C₄H₉)₂N | H | H | H | 197-198 |
| (e) | H | CH₃-⌬-NH-triazine(Cl)-NH | H | CH₃ | H | 287-289 |
| (f) | H | ⌬(CH₃)-NH-triazine(Cl)-NH | H | H | H | ¹ 256-257 |
| (g) | H | ⌬(CH₃)-NH-triazine(Cl)-NH | H | CH₃ | H | ¹ 255-256 |
| (h) | H | ⌬(CH₃)-NH-triazine((C₃H₇)₂N)-NH | H | H | H | 215-216 |

¹ (Decomp.)

These 7-v-triazolyl-(2)-coumarin compounds were obtained by reacting the 3-phenyl- or 3-p-tolyl-7-[4-amino-v-triazolyl-(2)]-coumarin described in Example 2 with o-anisoyl chloride (a;b), with cyanuric chloride and diethylamine or diisobutylamine (c;d), with 2-p-toluidino-4,6-dichloro-1,3,5-triazine (e), with 2-o-toluidino-4,6-dichloro-1,3,5-triazine (f;g) and with 2-o-toluidino-4,6-dichloro-1,3,5-triazine and dipropylamine (h).

Good results are also obtained, when the 7-v-triazolyl-(2)-coumarin compounds listed in the present example under (a) to (h) are replaced with the compounds listed in Example 1 under (c), (e), (h), (l) and (m) and in Example 4 under (d), (e), (f), (i), (k), (l), (n) and (o).

EXAMPLE 6

1 gram of one of the 7-v-triazolyl-(2)-coumarin compounds listed in Example 1 under (c), (e), (h), (l) and (m), in Example 2 under (a), (e), and (l), in Example 4 under (d), (e), (f), (i), (k), (l), (n) and (o) and in Example 5 under (a) is dissolved in 1000 g. of a colourless lacquer of nitrocellulose or cellulose acetate. The lacquer is then thinly spread on a colourless bottom. After drying, the lacquer film is excellently brightened.

We claim:
1. A 7 - v - triazolyl - (2) - coumarin compound of the formula

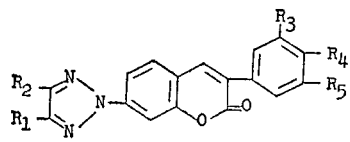

wherein $R_1$ is hydrogen, alkyl containing 1 to 2 carbon atoms or phenyl; $R_2$ is alkyl containing 1 to 3 carbon atoms, phenyl, methylphenyl, methoxyphenyl, chlorophenyl, carbethoxy, —CONH₂, 1,3,5-triazinylamino substituted with chloro, isopropoxy, dipropylamino, pyrrolidino, piperidino or hexamethyleneimino, alkylcarbonylamino containing 2 to 5 carbon atoms, ethoxymethylcarbonylamino ethoxycarbonylamino, phenylcarbonylamino, methylphenylcarbonylamino, methoxyphenylcarbonylamino; and $R_3$, $R_4$ and $R_5$ are hydrogen or methyl.

2. The compound of claim 1 wherein $R_1$ and $R_2$ are methyl and $R_3$, $R_4$ and $R_5$ are hydrogen.

3. The compound of claim 1 wherein $R_1$ is methyl, $R_2$ is phenyl and $R_3$, and $R_4$ and $R_5$ are hydrogen.

4. The compound of claim 1 wherein $R_1$ is methyl, $R_2$ is chlorophenyl and $R_3$, $R_4$ and $R_5$ are hydrogen.

5. The compound of claim 1 wherein $R_1$ and $R_2$ are phenyl, $R_3$ and $R_5$ are hydrogen and $R_4$ is methyl.

6. The compound of claim 1 wherein $R_1$ is phenyl, $R_2$ is carbamyl and $R_3$, $R_4$ and $R_5$ are hydrogen.

7. The compound of claim 1 wherein $R_1$ is phenyl, $R_2$ is carbamyl, $R_3$ and $R_5$ are hydrogen and $R_4$ is methyl.

8. The compound of claim 1 wherein $R_1$ is hydrogen, $R_2$ is methylcarbonylamino and $R_3$, $R_4$ and $R_5$ are hydrogen.

9. The compound of claim 1 wherein $R_1$, $R_3$, $R_4$ and $R_5$ are hydrogen and $R_2$ is isobutylcarbonylamino.

References Cited
FOREIGN PATENTS 1,388,469   12/1964   France _____ 260—308

ALTON D. ROLLINS, Primary Examiner

U.S. Cl. X.R.

117—33.5 R; 252—301.2 W; 260—146 R, 152, 249.5, 249.6, 249.8, 307 G, 343.2 R, 566 A, 566 AE